June 20, 1967   W. J. MORRILL   3,327,146
ELECTRO-MAGNETIC DEVICE AND METHOD OF MAKING LAMINATED
YOKE AND HOUSING MEMBER THEREFOR
Original Filed July 25, 1962   6 Sheets-Sheet 1
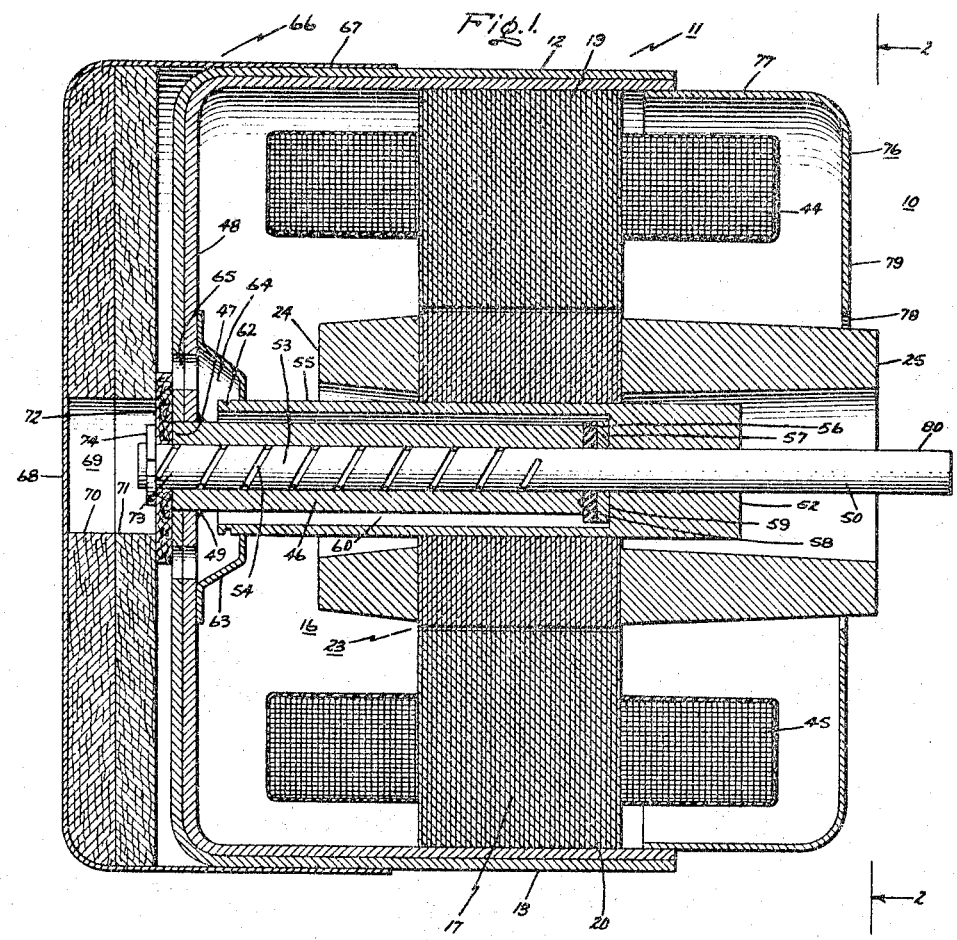
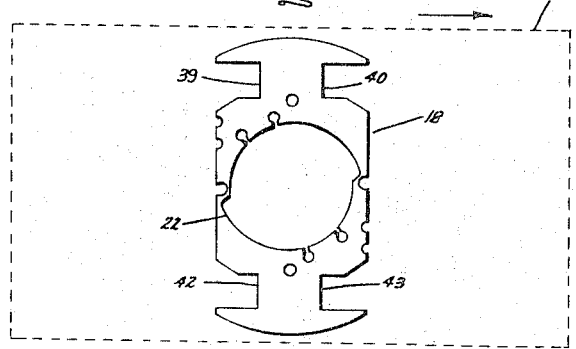
Inventor:
Wayne J. Morrill,
Hood, Gust & Irish
by
Attorneys.

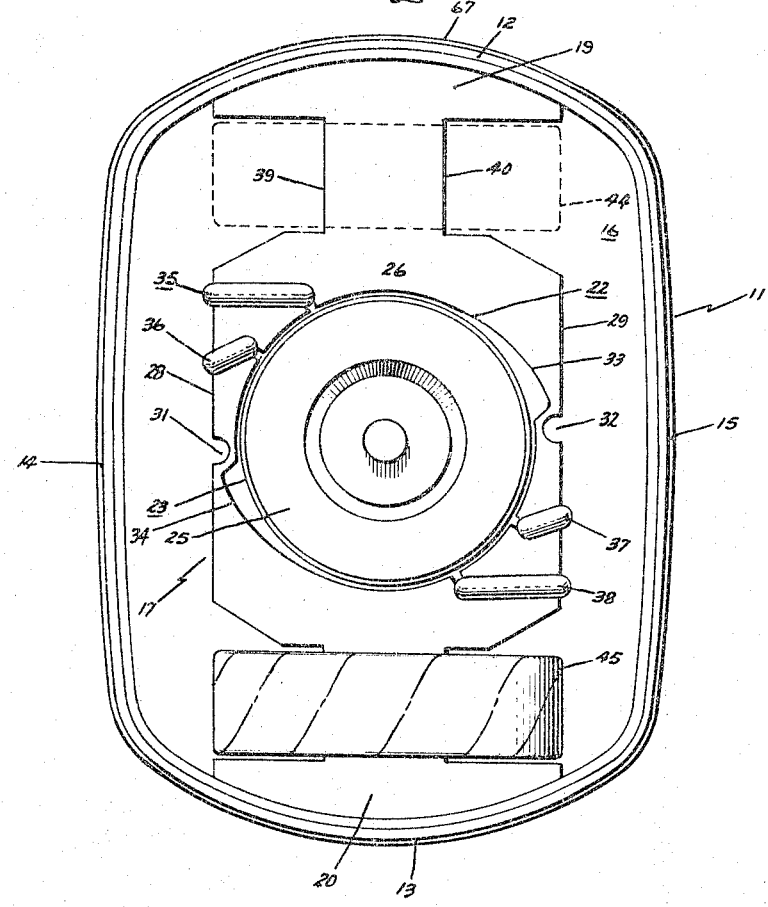

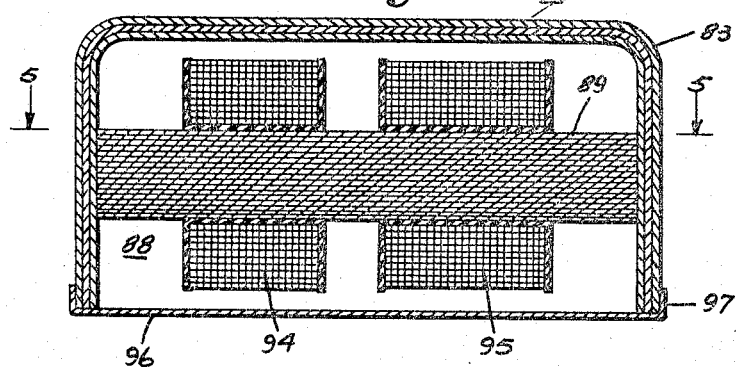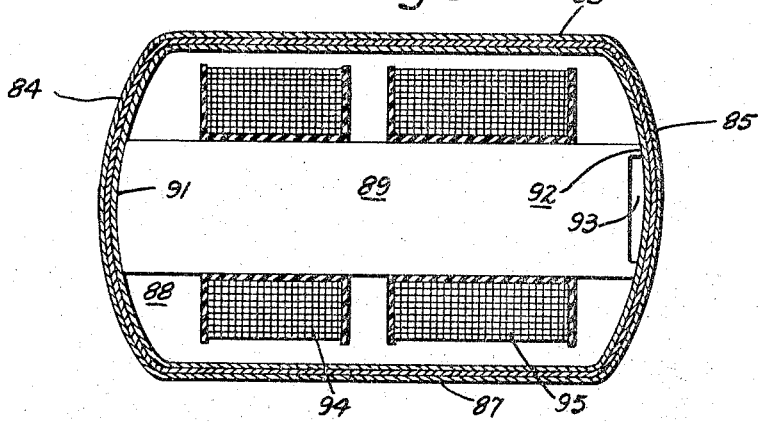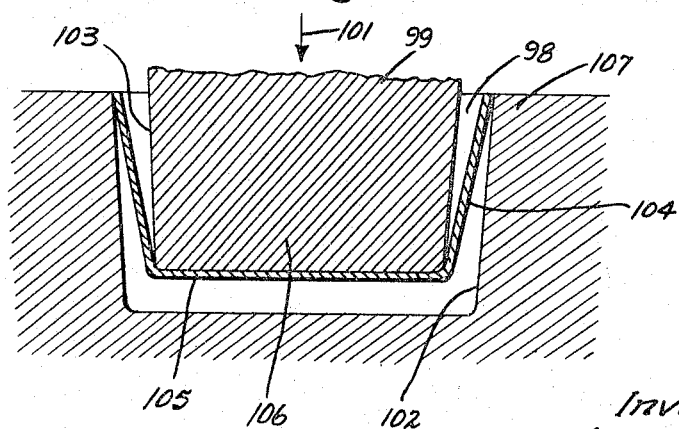

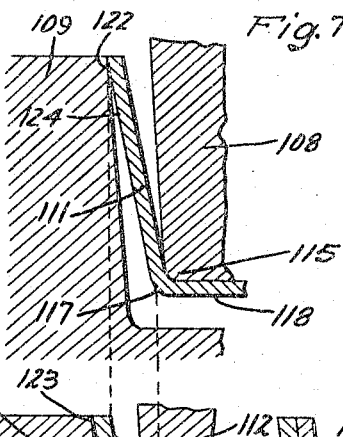
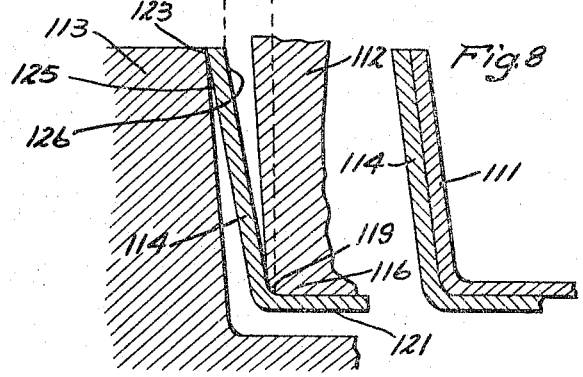
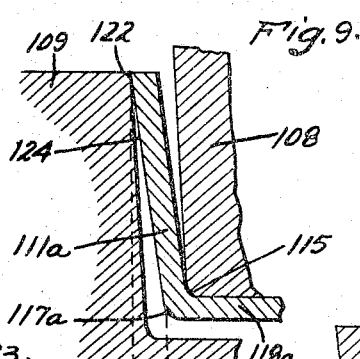
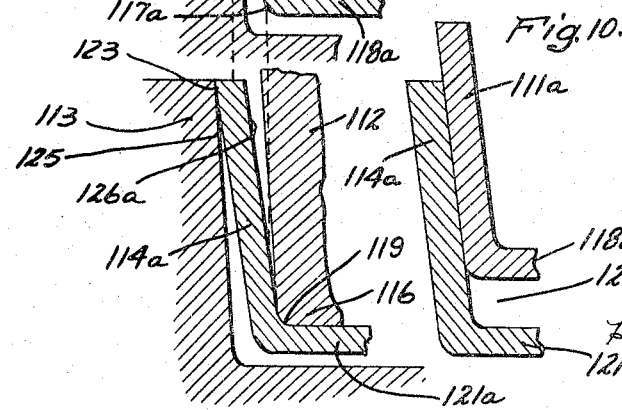

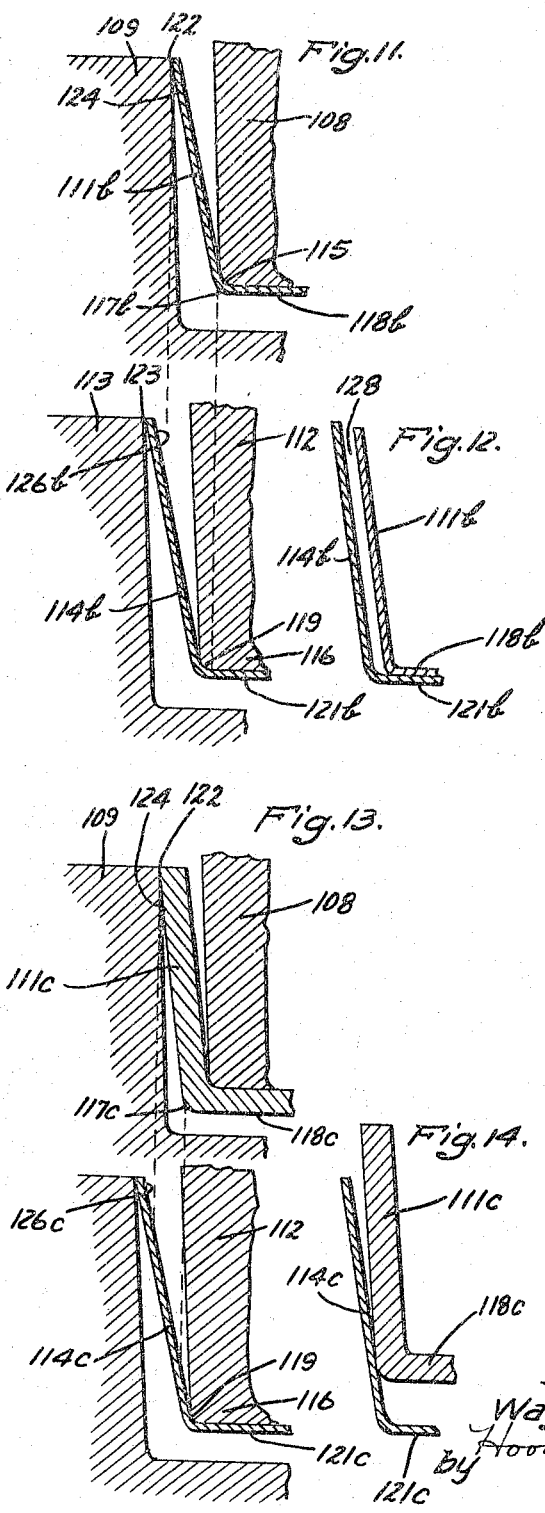

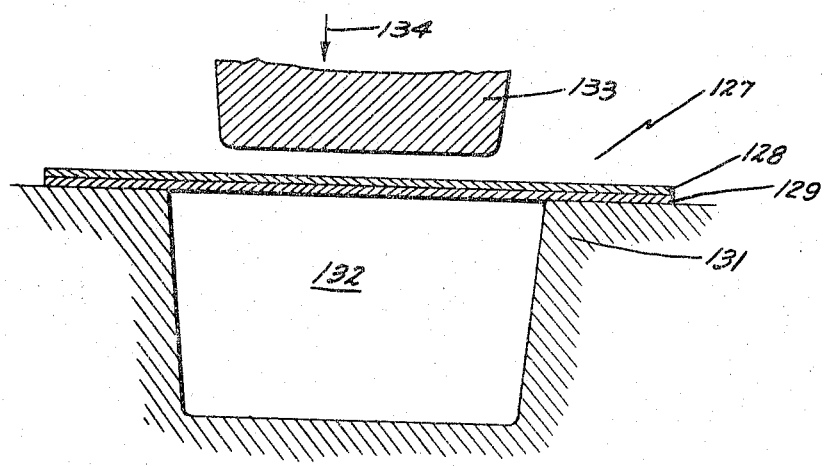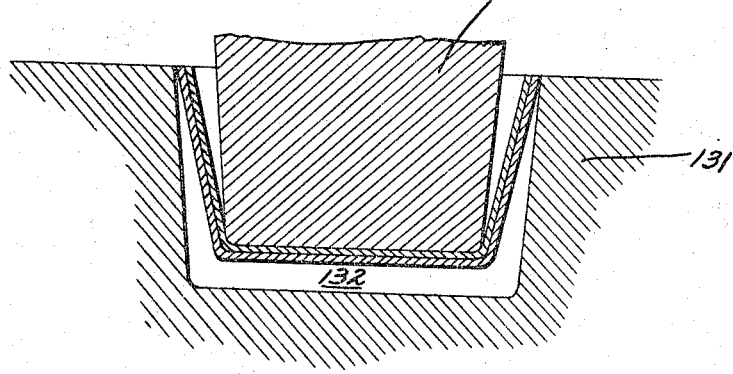

United States Patent Office 3,327,146
Patented June 20, 1967

3,327,146
ELECTRO-MAGNETIC DEVICE AND METHOD OF MAKING LAMINATED YOKE AND HOUSING MEMBER THEREFOR
Wayne J. Morrill, 3448 S. Washington Road, Fort Wayne, Ind. 46804
Original application July 25, 1962, Ser. No. 216,699. Divided and this application June 29, 1966, Ser. No. 590,445
8 Claims. (Cl. 310—216)

This application is a division of my application Ser. No. 216,699, filed July 25, 1962, Patent No. 3,293,729.

This invention relates generally to the magnetic structures for electro-magnetic devices, such as dynamo-electric machines and inductive devices, and to the method of making a laminated yoke and housing member for such devices. This application is a continuation-in-part of my application Ser. No. 789,700.

Electro-magnetic devices such as dynamoelectric machines, transformers, reactors, and the like, conventionally comprise a magnetic core structure having one part with one or more electrically energizable coils thereon for establishing magnetic flux in the core structure and another part commonly referred to as a yoke, which provides a magnetic return path for the flux.

It is frequently necessary or desirable that such electromagnetic devices be enclosed within a housing. In conventional constructions, such housings, while formed of metal, have not formed a part of the magnetic structure of the device and have thus added appreciably to the overall cost and the weight of the device. In the case of small transformers, such as ballast transformers for starting and operating fluorescent lamps, a common form of magnetic structure comprises a laminated center leg and a pair of laminated yoke members abutting opposite sides of the center leg member and defining winding windows therewith, the coils being disposed on the center leg and in the winding windows; with such a magnetic structure, some auxiliary means is required for maintaining the center leg member and the yoke members in assembled relation. Such a magnetic structure with the coils positioned thereon is all that is functionally required for operating the fluorescent lamps, however, the core and coil assembly is generally enclosed within a cup-shaped metal housing which is filled with potting compound. It would appear that the yoke core members and the core clamping means could be eliminated by employing the housing member as the magnetic return path for the center leg core member. However, in all except the smallest ballast transformers, the total flux-carrying requirement for the magnetic structure is such that the housing would have to have such thickness to dictate that it should be laminated in order to minimize losses. The provision of a laminated cup-shaped magnetic member has been thought to be impractical not only due to the requirement for providing multiple punch and die sets for each lamination, but also due to the difficulty of securing the requisite intimate engagement between adjacent laminations. If the laminations are not in intimate engagement thus providing air gaps between laminations, excessive losses result, and contrary-wise, if an inner cup-shaped lamination were required to be forced into an outer cup-shaped lamination, the resulting stresses would likewise cause excessive losses. Since the thickness tolerance in mill-run magnetic sheet steel is such that the requisite close unstressed engagement of adjacent laminations of separately formed cup-shape members cannot be assured in production, the use of a combined laminated cup-shaped yoke and housing member has not in the past been considered practical.

In the case of small motors, there are many applications in which minimum cost and size are extremely important; air moving applications such as the driving of refrigerator evaporator fan motors being typical. Motors of the shaded pole type have been widely employed for small air moving applications since a high starting torque is not required and in the particular case of refrigerator evaporator fan motors, skeleton motor constructions of the so-called C type have been widely employed by virtue of their extreme simplicity and thus economy; such skeleton C motors conventionally comprise a generally C-shaped laminated core with the ends of the legs defining the bore for the rotor member and the bight or connecting portion having a field exciting coil disposed thereon. Such prior skeleton motor constructions have a number of disadvantages which have been commonly recognized, these disadvantages being, however, tolerated in view of the extremely low cost of such motors. Among the disadvantages of the skeleton C motor construction are that it is eccentric in configuration, the air gap and bearings are exposed thus permitting dust and dirt to enter the same, and particularly there is substantial stray flux emanating from the core structure thus generally requiring the use of non-magnetic mounting arrangements. Furthermore, it is difficult to provide a large lubricating oil capacity in such skeleton C motors and also difficult to maintain the rotor and stator in proper alignment; it has been common practice to design such motors with a large air gap in order to tolerate a lack of concentricity and accepting the accompanying loss in efficiency or increase in copper. Furthermore, in common with all open motors, motors having the skeleton C construction do not create their own atmosphere and thus both the field exciting coil and the metallic parts of the motor, i.e., the stator core, rotor, shading coils, etc., may be subjected to a humid atmosphere with the resulting deterioration of the coil insulation and corrosion or rusting of the metal parts. In addition to the foregoing, in the particular case of refrigerator evaporator blowers, it has been required that some sort of drip pan or shelf be provided under an open type motor in order to catch debris, metal particles, etc., in the case of burn-out of the motor. Furthermore, motors of the skeleton C type construction tend to be unduly noisy due primarily to the lack of concentricity of the air gap.

It has therefore long been felt desirable in many applications for motors in the sub-fractional horse power ratings to replace the skeleton C motor construction with a totally enclosed, concentric motor construction, such a totally enclosed concentric construction however being no more expensive and occupying no more space than the prior skeleton-type motor constructions and further eliminating the long recognized disadvantages of such prior skeleton-type constructions. Merely enclosing a conventional motor core, coil and rotor assembly within an enclosing housing adds appreciably to the cost. It has been proposed, as in United States Patent No. 2,007,398 to Steven Kobzy, that a single laminated pole piece assembly be provided with a cup-shaped housing member providing the return magnetic path therefor. However, as in the case of transformers, motors in ratings other than the very smallest would require that such a combined yoke and housing member be laminated. However, for the same reasons as those in the case of transformers, it has not been considered practical to employ a laminated cup-shaped combined magnetic yoke and housing.

It is accordingly an object of my invention to provide an improved electro-magnetic device incorporating a laminated cup-shaped magnetic yoke and housing member.

Another object of my invention is to provide an improved method of making a laminated cup-shaped magnetic yoke and housing member for an electro-magnetic device.

A further object of my invention is to provide an improved dynamoelectric machine incorporating a cup-shaped magnetic yoke and housing member.

A still further object of my invention is to provide an improved inductive device incorporating a laminated cup-shaped magnetic yoke and housing member.

Further objects and advantages of my invention will become apparent by reference to the following description and the accompanying drawings, and the features of novelty which characterize my invention will be pointed out with particularity in the claims annexed to and forming a part of this specification.

I have found that a laminated cup-shaped member may be unitarily drawn from a laminated sheet of magnetic material comprising at least two relatively thin laminations, the resulting cup-shaped laminations being in intimate unstressed contact with each other throughout their entire surface areas, such intimate unstressed contact being inherently provided without regard to the thickness dimension of the magnetic sheet steel from which the member is drawn. Thus, in accordance with the invention, I have provided an electro-magnetic device incorporating a unitarily drawn laminated yoke and housing member in which the requisite degree of intimate engagement between the laminations is assured in production.

In the drawings:

FIG. 1 is a side elevational view, partly in cross-section and partly broken away, illustrating a shaded pole motor construction in accordance with my invention;

FIG. 2 is a view taken generally along the line 2—2 of FIG. 1 with the adjacent end shield removed in order better to reveal the stator core structure;

FIG. 3 shows an individual lamination employed in the pole piece member of FIGS. 1 and 2 and the preferred manner of punching the same from an elongated strip of relatively thin magnetic material;

FIG. 4 is a side cross-sectional view illustrating a ballast transformer construction in accordance with my invention;

FIG. 5 is a cross-sectional view taken along the line 5—5 of FIG. 4;

FIG. 6 is a diagrammatic cross-sectional view illustrating the method of drawing a cup-shaped member;

FIG. 7 is a fragmentary diagrammatic cross-sectional view illustrating the method of separately drawing two cup-shaped members to form a laminated cup-shaped member with the laminations properly sized as to thickness;

FIG. 8 is a fragmentary cross-sectional view of the laminated cup-shaped member formed of the laminations drawn as in FIG. 7;

FIG. 9 is a fragmentary diagrammatic cross-sectional view similar to FIG. 7 but showing laminations drawn from material which is oversized in thickness;

FIG. 10 is a fragmentary cross-sectional view showing a laminated cup-shaped member formed of the laminations drawn in FIG. 9;

FIG. 11 is a fragmentary diagrammatic cross-sectional view similar to FIGS. 7 and 9, but showing the drawing of laminations which are undersized as to thickness;

FIG. 12 is a fragmentary cross-sectional view showing a laminated cup-shaped member formed of the laminations drawn in FIG. 11;

FIG. 13 is a fragmentary diagrammatic cross-sectional view similar to FIGS. 7, 9, and 11 but showing the drawing of laminations with one lamination oversized as to thickness and the other undersized;

FIG. 14 is a fragmentary cross-sectional view showing a laminated cup-shaped member assembled from the laminations drawn in FIG. 13; and FIGS. 15 and 16 are diagrammatic views in cross-section illustrating the method of unitarily forming a laminated cup-shaped flux-carrying member in accordance with my invention.

Referring now to FIGS. 1, 2, and 3 of the drawing, it will be readily comprehended that my improved dynamoelectric machine construction, generally identified as 10, lends itself particularly to the provision of a single-phase alternating current motor of the shaded pole type, however, it will also be recognized that the broader aspects of my invention also lend themselves to other types of motors, such as the various well known commutator-type motors. Here I have shown a deep drawn, laminated shell or cup-shaped member 11, shown in the illustrated embodiment as being unitarily drawn from a laminated sheet comprising two unbonded laminations of relatively thin magnetic material, such as magnetic steel. As best seen in FIG. 2, the diametrically opposite side walls 12 and 13 of the shell 11 are arcuate in configuration whereas the intervening portions 14 and 15 respectively have a convex curvature with a radius greater than that of side walls 12 and 13. It will readily be seen that the cup-shaped shell member 11 defines a cavity 16 therein.

In accordance with my invention, I have provided an elongated pole piece member 17 disposed in the cavity 16 of the shell member 11 and being formed of a stacked plurality of relatively thin laminations 18 of magnetic material. The opposite ends 19 and 20 of the pole piece member 17 are arcuate in configuration, closely conforming to and respectively intimately engaging the inner surfaces of the arcuate side wall portions 12 and 13 of the shell member 11. The pole piece member 17 further has an opening 22 formed therethrough defining a bore for accommodating rotor member 23; rotor member 23 is shown as being of the conventional induction motor type formed of a stacked plurality of relatively thin laminations of magnetic material with a squirrel cage winding (not shown) arranged thereon of which short circulating end rings 24 and 25 form a part.

It will now be readily comprehended that the portions of the bore 22 on either side of rotor member 23 define salient poles 26 and 27 and it will be seen that respective pole tips are integrally joined by bridging sections 28 and 29. Notches 31 and 32 are respectively provided in the laminated edges of the pole piece member 17 adjacent the bridging sections 28 and 29 in order to provide the requisite high reluctance, as is well known in the art. It will further be seen that in the illustrated embodiment, the pole faces 33 and 34 of the salient poles 26, 27 respectively, are chamfered in accordance with my patent Number 2,773,999, issued December 11, 1956. However, while the chamfered pole face configuration is considered desirable from a performance standpoint, it will readily be understood that it does not form a part of the present invention and that the bore 22 may define a uniform concentric air gap with the outer surface of the rotor member 23. Conventional shading coils 35 and 36, and 37 and 38 are arranged on the salient pole portions 26 and 27, it being readily understood that the specific shading coil configurations shown do not form a part of my invention and that other shading coil arrangements well known in the art may be equally advantageously employed.

In order to accommodate the requisite field exciting coils on the pole piece member 17, cut-out portions or notches 39 and 40 are respectively formed in the laminated edges of pole piece member 17 intermediate salient pole 26 and arcuate end 19, and identical cut-out portions or notchs 42 and 43 are likewise formed in the laminated edges of the elongated pole piece member 17 intermediate the other salient pole 27 and its respective arcuate end 20, with field exciting coils 44 and 45 being respectively disposed therein, as shown; it will readily be seen that the coils 44 and 45 may be wound directly on the pole piece member 17 in notches 39, 40 and 42, 43 respectively, pole piece member 17 in essence forming a bobbin.

It will now readily be seen that the laminated shell 11 forms the magnetic yoke structure for the pole piece member 17, providing a magnetic return path therefor. It will further be readily understood that in contrast with the stator core construction of the prior skeleton C type struction, the cup-shaped shell member 11 is acoustically neutral thus substantially eliminating stray magnetic flux. It will also be seen that by virtue of its laminated construction, the cup-shaped shell member 11 is acoutically "dead" and thus the common sixty (60) cycle lamination hum so frequently found in prior motor constructions is virtually eliminated thus providing an extremely quiet motor, a most desirable characteristic in domestic refrigerator applications.

Further, in accordance with my invention, I have provided a unit-bearing construction for rotatably supporting the rotor member 23 by providing a bearing post member 46 having its outer end 47 secured in an opening in the end wall 48 of the cup-shaped shell member 11 in any suitable manner, as by welding at 49. Rotor member 23 is mounted on shaft 50 by means of a sleeve member 52, as shown. Shaft 50 has a portion 53 journaled in the bearing 46 and extending through and beyond end wall 48. Portion 53 of shaft 50 is preferably provided with suitable lubricant pumping grooves 54 in order to feed lubricant to the bearing 46. Sleeve member 52 which supports the rotor member 53 from the shaft 50 includes an elongated cylindrical flange portion 55 on which the laminated core of rotor member 23 is principally arranged, the cylindrical flange member 55 surrounding the outer surface of the bearing post 46 as shown. A pair of end-bump cushioning washers 56 and 57 are positioned on shaft 50 between the outer end 58 of the bearing post 46 and the inner end 59 of cavity 60 defined by the cylindrical flange 55 of the sleeve member 52.

A suitable lubricant-slinging groove 62 is formed in the outer end of annular flange 55 of sleeve member 52 and a suitable cup-shaped member 63 surrounds the outer end of sleeve member 52, being secured to the end wall 48 of shell member 11 and defining a cavity 64 therein. A plurality of openings 65 are formed in the end wall 48 of shell member 11 communicating with the cavity 64 defined by the cup-shaped member 63, as shown.

In order to provide a lubricant reservoir for the bearing 46, I have provided an outer cup-shaped member 66 formed of relatively thin material having its side wall 67 conforming to and fitted over the outer surface of the side walls 12, 13, 14 and 15 of shell member 11 and having its end wall 68 spaced from the end wall 48 of shell member 11 to define a lubricant-reservoir cavity 69; it will be observed that by virtue of the arcuate curvature of side walls 12 and 13 and the outwardly convex curvature of side walls 14 and 15 of shell member 11, the outer member 66 will pull tightly around the outer surface of shell member 11 at all points, thereby forming a good lubricant seal. Positioned in the cavity 69 are a pair of washer-shaped members 70 and 71 formed of suitable lubricant absorbent material, such as felt, which thus serve as a lubricant reservoir when impregnated with a suitable lubricant, such as conventional lubricating oil. In order to feed lubricant, as required, from the lubricant retaining reservoir members 70, 71, a washer-like wick member 72 is arranged on the end 73 of shaft 50 projecting outwardly from end wall 48 of shell member 11, being retained thereon in any suitable manner, such as by means of a suitable snap ring 74. It will be observed that the wick member 72 is in engagement with the lubricant retaining reservoir 70, 71 and also is cooperatively engaged by the spiral lubricant pumping groove 54 on shaft portion 53 so that lubricant retained in the member 70, 71 is fed to the shaft portion 53 by means of the wick member 72 and then carried therealong through the bearing 46 by means of lubricant pumping groove 54. The lubricant pumped along the journal surface of shaft portion 53 ultimately is carried out of the end 58 of bearing 46 and will be thrown centrifugally outwardly to the inner surface of the cylindrical flange portion 55 of sleeve member 52. The lubricant will then travel toward the end of the sleeve member 55 within the cup-shaped member 63, being ultimately thrown centrifugally outwardly into the cavity 64 of cup-shaped sleeve member 63 by means of the lubricant-slinging groove 62. This lubricant is then returned to the wick member 72 and the lubricant reservoir members 70, 71 through the openings 75 in the end wall 48 of the shell member 11. It will readily be comprehended that the specific lubricating arrangement above-described is shown here for illustrative purposes only, and that other well known unit-bearing lubricating arrangements may equally advantageously be employed. It will further be understood that while the unit-bearing construction shown is particularly suitable for a small air moving-type application for which the particular motor shown in the figures of the drawing was designed, my invention is also equally applicable to constructions employing two bearings rotatably supporting the shaft with the rotor member disposed therebetween.

Referring briefly to FIG. 3, it will readily be seen that the laminations 18 which form the pole piece member 17 of my invention may readily be transversely punched from an elongated strip 75 of magnetic material, as is well known in the art. It will thus be seen that essentially the only scrap material is that removed from the cut-out portions 39, 40, 42 and 43; the laminations forming the rotor member are conventionally punched from the bore 22.

In order to provide a totally enclosed motor construction, an end shield member 76 in the form of a cup-shaped member of relatively thin material is provided having its side wall 77 conforming to and fitted within the side walls 12, 13, 14 and 15 of the shell member 11 and having a central opening 78 formed in its end wall 79 through which the end ring 25 of rotor member 23 and shaft extension 80 projects.

It will now be seen that the improved magnetic structure of my invention, i.e., the elongated laminated pole piece member 17 and the drawn laminated cup-shaped shell member 11 provide far less leakage flux than has been provided in prior motors intended for the same application, the shell member being magnetically neutral. Thus, the designer need not concern himself with the effect of stray fields and the devising of suitable non-magnetic mounting arrangements for the motor 10, and further, the motor does not lose performance as a result of high magnetic leakage. It will further readily be comprehended that my improved motor construction is lighter than comparable constructions since the shell member 11 provides both the magnetic yoke and a closure member. It further is possible in accordance with my invention to wind the field exciting coils directly onto the poles, thus eliminating the requirement for more expensive and complex winding machines or the requirement for pre-winding of the coils and their manual positioning on the core structure. As pointed out above, a very minimal amount of scrap is provided in punching the laminations 18 of the pole piece member 17, and further, and very importantly, it is now possible readily to obtain positive permanent alignment of the parts of the motor and to control and hold a much smaller concentric air gap; in larger motors, the bore 22 of the pole piece member 17 may be ground after the pole piece member is positioned within the shell piece member 11, using the bearing as a center, and that the outside diameter of the rotor member 23 may likewise be turned using the shaft 50 as the center, thus insuring accurate concentricity of the bore 22 and the outer surface of the armature member 23, in turn making it possible to employ a much smaller concentric air gap than has previously been thought economically feasible in such small motors. Alternatively, and especially in the smaller motors, high concentricity between the bearing bore and the stator bore is obtained by boring the bearing while holding the stator from its bore. It may further be found desirable to grind the outside diameter of the ends 19 and 20 of the pole piece member 17 in order to insure an intimate engagement with the inner surface of the arcuate portions 12 and 13 of shell member 11. It will also be observed that my improved motor construction permits the incorporation of a much larger lubricant reservoir than has previously been possible with the skeleton C type motors.

While an arcuate seat has been provided for the stator laminations by virtue of the arcuate curvature of side walls 12 and 13 of shell member 11 and the mating arcuate configuration of ends 19 and 20 of the pole piece member 17, it will be readily seen that a keyed flat seat or a seat having a generally V-shaped configuration may equally advantageously be employed to locate the pole piece member 17 in the shell 11.

While a two pole motor construction has been shown and described it will be readily comprehended that the principles of my invention are equally applicable to motors having a larger number of poles, for example, a four pole motor.

In a specific two pole motor constructed in accordance with FIGS. 1, 2 and 3 of the drawing and providing a power output of approximately one (1) watt, shell member 11 was unitarily drawn from two laminations of 20 gauge magnetic steel with its inside diameter between its arcuate portions 12 and 13 being 2.300 inches and its inside diameter between parallel sides 14 and 15 being 1.695 inches. The overall length of this motor was 1.915 inches and its weight 2 pounds 3 ounces.

Referring now to FIGS. 4 and 5 of the drawing, my invention is shown embodied in a high reactance transformer construction of the type employed for ballasting, i.e., starting and operating fluorescent lamps. The transformer, generally identified at 82, comprises a deep drawn, laminated cup-shaped yoke and housing member 83, shown in the illustrated embodiment as being unitarily drawn from a laminated sheet comprising three unbonded laminations of relatively thin magnetic material, such as magnetic steel. As seen in FIG. 5, the diametrically opposite side walls 84 and 85 of the cup-shaped member 83 are arcuate in configuration and the intervening portions 86 and 87 are straight and parallel. The cup-shaped member 83 defines a cavity 88 therein.

An elongated center leg core member 89 is provided formed of a stacked plurality of relatively thin laminations of magnetic material. Center leg core member 89 is disposed in the cavity 88 and the opposite ends 91 and 92 are arcuate in configuration closely conforming to and respectively intimately engaging the inner surfaces of the arcuate side wall portions 84 and 85 of the cup-shaped member 83. End 92 of center leg 89 may have a cut-out portion 93 therein defining a bridged air gap which may be desired when the ballast is employed in a leading current lamp circuit.

Suitable coils 94 and 95 are positioned on the center leg 89; coil 94 may be a primary winding adapted to be connected to a suitable source of single phase alternating current, and coil 95 may be a secondary winding adapted to be connected to a fluorescent lamp circuit. The particular coils shown on the center leg 89 do not form a part of my invention, being shown for illustrative purposes only.

After assembly of the center leg core member 89 with the coils 94, 95 thereon in the cavity 88, the cavity may be filled with a suitable plotting compound, as is well known to those skilled in the art. A cover member 96 is provided drawn from a sheet of relatively thin metal and having its side walls 97 conforming to and fitted over the outer surface of the side wall 84, 85, 86 and 87 of the laminated cup-shaped member 83, as shown.

It will be seen that the laminated cup-shaped member 83 not only functions as a housing for the core and coil assembly, but also serves as the magnetic yoke for the center leg core member 89, providing the magnetic return path therefore thus eliminating the separate laminated yoke core members and clamping devices previously required for ballast transformers of this type.

Referring now to FIG. 6, a cup-shaped member is conventionally drawn from a sheet of relatively thin metal by providing a blank of the necessary size and configuration which is then placed over a die cavity 98. A suitable punch 99 is then moved downwardly, as shown by the arrow 101 so as to draw the blank downwardly into the cavity 98, as shown. It will be observed that appreciable clearance is provided between the wall 102 of the die cavity and the outer surface 103 of the punch. It will further be seen that the resulting cup-shaped member 104 has its inside diameter adjacent its bottom wall 105 defined by the outside diameter of the punch 99 adjacent its bottom end 106, and its outside diameter adjacent its upper end defined by the inside diameter of wall 102 of cavity 98 adjacent its upper end 107. Thus it will be seen that regardless of the thickness of the sheet material from which the cup-shaped member 104 is drawn, the inside diameter at the bottom end and the outside diameter at the top end are fixed and will be the same when the same punch and die combination is employed.

Referring now to FIG. 7, if a laminated cup-shaped member were to be formed of two separately drawn laminations assembled one within the other after drawing, separate punch and die sets would be required for each lamination. Thus, assuming that the cup-shaped member were to be formed of two laminations, a punch 108 and a die 109 would be required for the inner lamination 111, and another punch 112 and die 113 would be required for the outer lamination 114. Assuming now that the sheet metal from which the cup-shaped members 111 and 114 are separately drawn is of the same predetermined thickness, the outside diameter 115 of the smaller punch 108 and the outside diameter 116 of the larger punch 112 will be relatively proportioned so that the outside diameter 117 the smaller cup-shaped member 111 adjacent its end 118 precisely fits within the inside diameter 119 of the larger cup-shaped member 114 adjacent its end 121 with the requisite intimate unstressed engagement. Likewise, the inside diameter 122 of the smaller die 109 adjacent its upper end and the inside diameter 123 of the larger die 113 adjacent its upper end are relatively proportioned so that the outside diameter 124 of the smaller cup-shaped member 111 adjacent its upper end precisely fits within the inside diameter 126 of the larger cup-shaped member 114 adjacent its upper end with the requisite intimate unstressed engagement as shown in FIG. 8.

It is well known that mill-run sheet steel has a thickness variation or tolerance. Thus, mill-run 20 gauge magnetic sheet steel has a normal thickness of .0359 inch±.003 inch, i.e. a thickness variation of .006 inch. Referring now to FIG. 9 in which like elements are indicated by like reference numerals, and in which it will be understood that relative dimensions are exaggerated for the purpose of illustration, there is shown the condition which will prevail when the sheet steel from which the inner end outer cup-shaped members are respectively formed is over-sized as to thickness. It will be seen that the outside diameter 124 of the smaller cup-shaped member 111 at its upper end is fixed by the inside diameter 122 of the die 109 at its upper end and thus will be the same as in the case of FIG. 7, regardless of the fact that the blank from which the cup-shaped member 111a is drawn is thicker than in the case of FIG. 7. It will also be observed that the inside diameter of the cup-shaped member 111a at its bottom end 118a is fixed by the outside diameter 115 of the punch 108 at its bottom end and thus will be the same as in the case of FIG. 7, again regardless of the fact that the material from which the cup-shaped member 111 is formed is thicker than in the case of FIG. 7. However, it is particularly to be observed that by virtue of the increased thickness of the blank from which the cup-shaped member 111a is drawn, the outside diameter 117a at the bottom end 118a will be increased over the outside diameter 117 in the case of FIG. 7 by twice the increase in thickness of the material over the nominal thickness. Thus, in the case of 20 gauge cold rolled magnetic steel, if the thickness is at the maximum tolerance of .0362 inch, i.e., .003 inch over the nominal thickness of .0359 inch, the outside diameter 117a of the inner cup-shaped member 111a at its bottom end 118a will be .006 inch greater than the outside diameter 117 of the cup-shaped member 111 of FIG. 7. Considering now the outer cup-shaped member 114a, it will be recalled that its outside diameter 125 at its upper end is fixed by the inside diameter 123 of the die 113 and will thus be the same as in the case of FIG. 7. However, the inside diameter 126a at its upper end will now be smaller by twice the tolerance, i.e., in the example being discussed, .006 inch smaller than the inside diameter 126 of the outer cup-shaped member 114 in FIG. 7. Likewise, the inside diameter 119 of the outer cup-shaped member 114a is fixed by the outside diameter 116 of the punch 112 and will thus be the same as in FIG. 7. However, with the outside diameter 117a of the inner cup-shaped member 111a increased by .006 inch as above described, it will be seen that when an effort is made to assemble the inner cup-shaped member 111a within the outer cup-shaped member 114a, the condition as shown in FIG. 10 will prevail wherein, with the inner cup-shaped member 111a inserted in the outer cup-shaped member 114a so that their side walls are in intimate unstressed engagement, the bottom walls 118a and 121a will be spaced apart thus providing an objectionable air gap 127 with consequent objectionable losses. However, if the two cup-shaped members 111a and 114a are pressed together with the necessary force to bring the bottom walls 118a and 121a into engagement, one or the other or both of the cup-shaped members 111a and 114a will be distorted and both will be mechanically stressed thus substantially increasing the magnetic losses in the resulting structure. It will be seen further that in case it is desired to employ coated steel in order to increase the electrical resistance between adjacent laminations, mechanically forcing the inner cup-shaped member 111a into the outer cup-shaped member 114a will result in scraping the insulating coating between the members thus at least partially destroying its effectiveness.

Referring now to FIGS. 11 and 12 in which like elements are again indicated by like reference numerals, it will readily be seen that where both cup-shaped members 111b and 114b are separately drawn from sheet steel which is undersized as to thickness, the outside diameter 117b of the inner cup-shaped member 111b at its bottom end 118b will be smaller than the inside diameter 119 of the outer cup-shaped member 114b at its bottom end 121 by twice the variation in thickness of the material from the nominal thickness dimension, and likewise that the inside diameter 126b of the outer cup-shaped member 114b will be larger than the outside diameter 124 of the inner cup-shaped member 111b by twice the thickness variation. Thus, when the two members 111b and 114b are assembled, one within the other, the result shown in FIG. 12 is provided wherein the side walls are separated by an air gap 128 having a width equal to the thickness variation, this air gap again producing undesirable losses. Further, with the arrangement shown in FIG. 12 which results from the use of sheet material which is under-sized as to thickness, objectionable rattling or magnetic hum will be provided and also, the structure does not have the requisite mechanical rigidity due to the looseness of the inner and outer cup-shaped members 111b and 114b.

Referring now to FIGS. 13 and 14, it might be assumed that the above described practical difficulties in employing separately drawn cup-shaped members could be eliminated by matching an inner cup-shaped member formed of oversized material and an outer cup-shaped member formed of under-sized material. Inspection of FIGS. 13 and 14 in which like elements are still indicated by like reference numerals will, however, indicate that this too will not provide the desired intimate unstressed contact between the inner and outer cup-shaped members 111c and 114c since the outside diameter 117c of the inner cup-shaped member 111c will be greater than the inside diameter 119 of the outer cup-shaped member 114c, and the inside diameter 126c of the outer cup-shaped member 114c will be less than the outside diameter 124 of the inner cup-shaped member 111c, thus producing the obviously undesirable relationship shown in FIG. 14 when an attempt is made to assemble the two cup-shaped members to form a laminated assembly. It will be readily seen that a reversal of the condition shown in FIGS. 13 and 14, i.e., an oversized outer cup-shaped member 114 and an undersized cup-shaped member 111 will reverse the condition shown in FIG. 14 so that the condition similar to that shown in FIG. 10 is obtained.

It will now be readily apparent that in order to form a laminated cup-shaped member of separately drawn cup-shaped laminations, not only is it necessary to provide separate punch and die sets for each lamination with the added cost, but further even with precisely sized sheet steel, it is essential that the tolerances in both the punch and die cavity for each set be held to an absolute minimum. It will further be seen that unequal wear in the punch and die sets will result in either undesirable looseness or tightness when the laminations are assembled. Most importantly, however, it will be observed that any appreciable variation in thickness of the sheet material from the nominal thickness dimension for which the punch and die sets were designed will result in the undesirable conditions described above. While precisely sized sheet steel can be purchased, or selected before use, this is obviously at a very substantial additional expense. It will now be readily seen that for the above-described reasons, the provision of a laminated flux carrying cup-shaped member with separately drawn laminations has not in the past been considered to be practical from a production standpoint.

Referring now to FIGS. 15 and 16, in accordance with my invention, a blank 127 formed of the desired number of laminations 128 and 129, shown here as being two in number, is placed on die 131 over cavity 132. Punch 133 is then moved downwardly, as shown by arrow 134, thus unitarily drawing the laminated blank 127 downwardly into cavity 132 to form the resultant cup-shaped yoke member 12 of FIG. 1, or 83 of FIGS. 4 and 5, the deformation of sheets 128, 129 resulting from the drawing operation being such as to create a press-fit between the individual cup-shaped members but not sufficient to create a bond therebetween.

I have found that when a laminated blank is thus unitarily drawn into cup-shape, the individual laminations have the requisite intimate contact being neither too tight, and thus stressed or distorted, or too loose, such intimate unstressed contact being obtained every time without regard to variation in the thickness of the laminations forming the blank 127. It will further be seen that tolerances in the punch and die are not critical nor is wear in the punch and die critical. Most importantly, the thickness of the laminations making up the blank is not a factor and mill-run sheet steel may be employed or if desired, even totally different gauges of material may be used for different laminations. While a unitarily drawn cup-shaped member formed of two laminations is shown in FIGS. 1 through 3, and a unitarily drawn cup-shaped member having three laminations is shown in FIGS. 4 and 5, I have found that laminated cup-shaped members may be unitarily drawn with as many as five laminations.

It will now be seen that in accordance with my invention, I have provided a method of unitarily drawing a laminated cup-shaped flux-carrying member wherein the requisite intimate unstressed engagement between laminations is always provided in production, thus for the first time making it economically possible to employ a laminated cup-shaped member for a combined magnetic yoke and housing for an electro-magnetic device.

While I have illustrated and described a specific embodiment of my invention, further modification and improvements will occur to those skilled in the art, and I desire therefore, in the appended claims, to cover all modifications which do not depart from the spirit and scope of my invention.

What is claimed is:

1. An electro-magnetic device comprising: a laminated magnetic core member having opposite ends; means on said core member for producing magnetic flux lines in said core member extending between said opposite ends; and a generally cup-shaped laminated housing and magnetic yoke member for said core member and said means, said cup-shaped member having side and bottom walls defining a cavity, said core member extending across said cavity with said opposite ends respectively engaging said side wall, said cup-shaped member being unitarily drawn from a laminated sheet of magnetic material comprising at least two relatively thin unbonded laminations whereby the laminations of said cup-shaped member throughout the extent of said side and bottom walls are in intimate unstressed contact.

2. The combination of claim 1 wherein said means comprises at least one coil.

3. In an alternating current dynamoelectric machine, field and housing structure comprising: a laminated cup-shaped member unitarily drawn from a laminated sheet of magnetic material comprising at least two relatively thin unbonded laminations and defining a cavity, and a laminated pole piece member extending across said cavity with its ends respectively engaging the inner surface of the side wall of said cup-shaped member, said pole piece member having an opening formed therethrough providing a bore for the rotor member of said machine, the portions of said pole piece member on either side of said bore forming salient poles, said pole piece member being adapted to have at least one field exciting coil arranged thereon, said cup-shaped member serving as the magnetic yoke for said pole piece member providing a magnetic return path therefor.

4. In an alternating current dynamoelectric machine, a field and housing structure comprising: a laminated cup-shaped member unitarily drawn from a laminated sheet of magnetic material comprising at least two relatively thin unbonded laminations and defining a cavity, at least two opposite portions of the side wall of said cup-shaped member being generally arcuate with the intervening side wall portions respectively having a convex curvature of substantially greater radius than the curvature of said opposite wall portions; and an elongated laminated pole piece member extending across said cavity with its ends being respectively generally arcuate and engaging the inner surface of said opposite side wall portions of said cup-shaped member, said pole piece member having an opening formed therethrough providing a bore for the rotor member of said machine, the portions of said pole piece member on either side of said bore respectively forming salient poles, said pole piece member being adapted to have at least one field exciting coil arranged thereon intermediate a respective end thereof and said bore, said cup-shaped member serving as the magnetic yoke for said pole piece member providing a magnetic return path therefor.

5. An alternating current dynamoelectric machine comprising: a laminated cup-shaped member unitarily drawn from a laminated sheet of magnetic material comprising at least two relatively thin unbonded laminations and defining a cavity, at least two opposite portions of the side wall of said cup-shaped member being generally arcuate with the intervening side wall portions respectively having a convex curvature of substantially greater radius than the curvature of said opposite wall portions; a bearing post having one end secured to the end wall of said cup-shaped member and extending into said cavity; an elongated laminated pole piece member extending across said cavity with its ends being respectively generally arcuate and engaging the inner surface of said opposite side wall portions of said cup-shaped member, said pole piece member having an opening formed therethrough concentric with said bearing post providing a bore, the portions of said pole piece member on either side of said bore forming salient poles; a field exciting coil on said pole piece member, said cup-shaped member serving as the magnetic yoke for said pole piece member providing a magnetic return path therefor; another cup-shaped member drawn from a sheet of relatively thin material having its side wall engaging the outer surface of the side wall of said first-named cup-shaped member and having its end wall spaced from the outer surface of the end wall of said first cup-shaped member thereby defining a lubricant reservoir cavity; lubricant absorbent material positioned in said lubricant reservoir cavity, a rotor member arranged in said bore defining an air gap therewith and having a shaft journaled in said bearing, said shaft having an end extending into said lubricant reservoir cavity and cooperating with said lubricant absorbent material whereby lubricant is fed to said bearing; and a third cup-shaped member drawn from a sheet of relatively thin material and having its side wall engaging the side wall of said first-named cup-shaped member on the side of said pole piece member remote from said end wall of said first cup-shaped member, said third cup-shaped member having an opening formed in its end wall with said shaft extending therethrough thereby completing an enclosure for said machine.

6. In an inductive device, a magnetic and housing structure comprising: a laminated cup-shaped member unitarily drawn from a laminated sheet of magnetic material comprising at least two relatively thin unbonded laminations and defining a cavity; a laminated centerleg core member extending across said cavity with its ends respectively engaging the inner surface of the side wall of said cup-shaped member; and at least one coil on said core member; said cup-shaped member serving as the magnetic yoke for said core member providing a magnetic return path therefor.

7. In an inductive device, a magnetic and housing structure comprising: a laminated cup-shaped member unitarily drawn from a laminated sheet of magnetic material comprising at least two relatively thin unbonded laminations and defining a cavity, at least two opposite portions of the side wall of said cup-shaped member being generally arcuate; an elongated laminated center leg core member extending across said cavity with its opposite ends being respectively generally arcuate and engaging the inner surface of said opposite side wall portions of said cup-shaped member; at least one coil on said core member; said cup-shaped member serving as the magnetic yoke for said core member providing a magnetic return path therefor.

8. The combination of claim 7 further comprising: a shallow cup-shaped cover member drawn from a sheet of relatively thin material having its side wall engaging the side wall of said laminated cup-shaped member and closing said cavity.

References Cited

UNITED STATES PATENTS

| | | | |
|---|---|---|---|
| 2,007,398 | 7/1935 | Kobzy | 310—172 |
| 3,021,444 | 2/1962 | Simmons et al. | 310—259 |

MILTON O. HIRSHFIELD, *Primary Examiner.*

L. L. SMITH, *Assistant Examiner.*

UNITED STATES PATENT OFFICE

CERTIFICATE OF CORRECTION

Patent No. 3,327,146　　　　　　　　　　　　June 20, 1967

Wayne J. Morrill

It is hereby certified that error appears in the above numbered patent requiring correction and that the said Letters Patent should read as corrected below.

Column 4, line 66, for "notchs" read -- notches --; column 5, line 5, for "struction, the cup-shaped" read -- motors, the laminated --; same line 5, for "acoustically" read -- magnetically --; line 8, for "acoutically" read -- acoustically --; column 7, line 67, for "plotting" read -- potting --.

Signed and sealed this 6th day of August 1968.

(SEAL)
Attest:

Edward M. Fletcher, Jr.　　　　　　　　　　　EDWARD J. BRENNER
Attesting Officer　　　　　　　　　　　　　　Commissioner of Patents